Oct. 6, 1942.   K. PERKINS   2,298,155
ELECTRIC DEVICE FOR SEWING MACHINES
Filed Sept. 18, 1940

Inventor
Kenneth Perkins

Witness:
John H. Cave

By
John F. Hine
Attorney

Patented Oct. 6, 1942

2,298,155

UNITED STATES PATENT OFFICE 2,298,155

ELECTRIC DRIVE FOR SEWING MACHINES

Kenneth Perkins, Scotch Plains, N. J., assignor to The Singer Manufacturing Company, Elizabeth, N. J., a corporation of New Jersey Application September 18, 1940, Serial No. 357,204

4 Claims. (Cl. 172—36)

This invention relates to sewing machines and more particularly to electric drives for sewing machines, and has for one of its objectives the provision of an improved bracket for adjustably and detachably securing the motor to the sewing machine.

Another object of the invention is to mold the motor casing from a thermo-setting compound and to form the molded casing with depending walls which together with the supporting bracket for the motor form a closure for the electrical connections to the motor.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

In the drawing, Fig. 1 is an end elevation of the sewing machine having my improved motor and motor support attached thereto.

Figures 1, 2, 3, 4, 5:
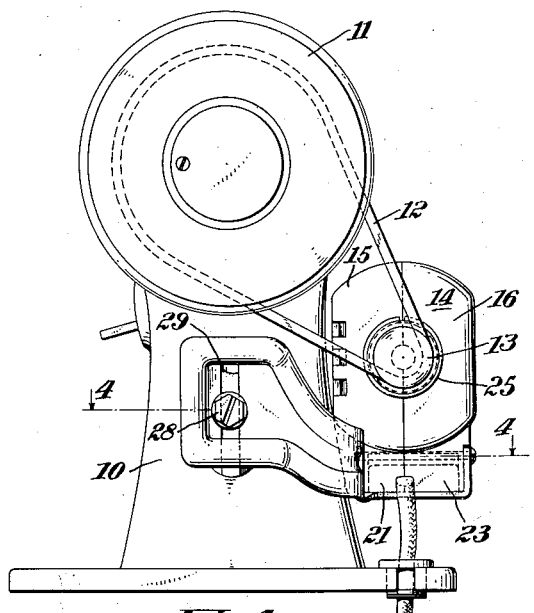
Fig. 2 is a bottom plan view of the motor.
Fig. 3 is a plan view showing the two halves of the motor casing separated to expose the working parts of the motor.
Fig. 4 is a sectional view taken substantially along the line 4—4 of Fig. 1.
Fig. 5 is a perspective view of the motor supporting bracket.

In the embodiment of the invention selected for illustration, 10 represents a sewing machine having a balance wheel 11 which is driven by means of a belt 12 and pulley 13 actuated by the motor 14. The casing for the motor 14 is formed by two halves 15 and 16 split longitudinally of the motor along a plane intersecting the rotor shaft and molded from a thermo-setting compound. The motor is of the standard type being provided with field coils 17 and a rotor 17', with the shaft 18 which supports the rotor journaled in self-aligning bearings 19. The half 15 of the molded casing has formed therewith a depending side wall 20 and end walls 21, and the other half 16 is formed with a corresponding side wall 22 and end walls 23. The parts of the motor are assembled in one of the halves and the other half is then placed in position over these parts and the two halves are held together by means of split spring rings 25 which embrace the split bearing lugs 26 formed on the motor casing, it being understood that the bearings 19, field coil 17 and other parts of the motor are clamped between the two halves.

When the motor is assembled the side walls 20, 22 and end walls 21, 23 form a rectangular shaped enclosure which are adapted to enclose the electrical connections for the motor. The electrical connections are the same as that shown in the patent to D. D. Way, No. 2,174,297, dated Sept. 26, 1939, and inasmuch as the specific electric connections form no part of this invention, detailed illustration and description thereof is deemed unnecessary. The motor 14 is adjustably and removably supported on the machine by means of a screw 28 which is threaded into the machine arm and extends through a slot 29 in the limb 30 of the supporting bracket for the motor. The bracket is formed with a laterally extending portion 31 which is U-shaped in cross-section and is adapted to receive the side walls 20, 22 of the motor 14. Screws 32 extend through the upstanding limbs of the U-shaped portion 31 and pass through lugs 33 formed on the molded casing for the purpose of holding the motor on the bracket. It will be understood that the walls 20, 22 and 21, 23 are provided with suitable apertures for the electrical conduits and that these walls together with the horizontal U-shaped portion 34 of the bracket form a closure for the connections to the motor.

It will also be understood that the U-shaped portion of the bracket functions as a clamp for the two halves 15 and 16 of the motor casing, and thus serves as additional means for holding the two halves together. From the foregoing it will be apparent that the motor-bracket has three functions. First, it supports the motor; second, it forms together with walls and the motor casing a housing for electrical connections; third, it acts as an additional means for holding the two halves of the motor casing together.

Having thus set forth the nature of the invention, what I claim herein is:

1. A bracket for attaching an electric motor to a sewing machine comprising an L-shaped member with one of its ends provided with means for attachment to a sewing machine and its other end being U-shaped to receive depending walls formed on the motor casing, said depending walls and U-shaped portion forming between them a closure for the electrical connections to the motor.

2. An electric drive for sewing machines including a motor having a casing formed in two parts, said parts being provided with depending walls, a bracket for supporting the motor having a U-shaped portion embracing said walls and together with said walls forming a closure for the electrical connections to the motor and means for securing said bracket to a sewing machine.

3. An electric drive for sewing machines including a motor having a casing split longitudinally of the motor into two halves, each half being formed with outwardly extending end walls and a side wall which together form an enclosure for electrical connections and a bracket for attaching the motor to the machine, said bracket having a portion which cooperates with said walls to form a closure.

4. An electric drive for sewing machines including a motor having a casing formed in two parts, said parts being provided with depending walls, and a bracket for supporting the motor having a U-shaped portion embracing said walls, and means for securing said bracket to said motor.

KENNETH PERKINS.